Dec. 5, 1967     D. S. BLISS     3,356,041
TRACTION SYSTEMS

Filed Sept. 26, 1966     2 Sheets-Sheet 1

INVENTOR
D. S. BLISS
BY
Cameron, Kerkam & Sutton
ATTORNEYS

Dec. 5, 1967  D. S. BLISS  3,356,041
TRACTION SYSTEMS
Filed Sept. 26, 1966  2 Sheets-Sheet 2

INVENTOR
D. S. BLISS
BY
Cameron, Kerkam & Sutton
ATTORNEYS

United States Patent Office 3,356,041
Patented Dec. 5, 1967

3,356,041
TRACTION SYSTEMS
Denys Stanley Bliss, Ashurst, Southampton, England, assignor to Hovercraft Development Limited, London, England, a British company
Filed Sept. 26, 1966, Ser. No. 582,067
Claims priority, application Great Britain, May 18, 1962, 19,344/62
9 Claims. (Cl. 104—148)

ABSTRACT OF THE DISCLOSURE

In a traction system wherein a vehicle is propelled along a prepared track by a linear motor co-operating with conductor means associated with the track, the driving linear motor is arranged for regenerative braking and the vehicle is provided with a second linear motor means which is energised by the regenerative output of the driving linear motor to create a reverse thrust on the track and thereby provide additional braking power. Switching means are provided for varying the pole-pitch of the travelling field of the driving linear motor and thereby varying the synchronous speed setting of the motor. The vehicle may also carry a reactive device, or a separately driven exciter, to ensure that the strength of the magnetic field of the driving linear motor remains sufficient to enable the motor to regenerate power in the event of a failure of the main power supply. The second or braking linear motor means may be either a part of the assembly of the driving linear motor, or a separate entity.

---

This invention relates to traction systems involving the use of linear electric induction motors, these latter being referred to hereinafter as "linear motors."

In such systems, a vehicle, which may be one of a train, is arranged to run in conjunction with a track and the vehicle (or the track) may carry electromagnetic means for creating a magnetic field which travels along the direction of motion; the track (or the vehicle) has co-operating means, such as an electrically conducting strip, or another electromagnetic means, which interact with the first means to produce a force causing the movement of the vehicle along the track; the force is in such a direction as to reduce the relative velocity between the field and the co-operating means.

The simplest arrangement for a track of appreciable length will, of course, be one in which the track includes a continuous conducting strip, since there is then no necessity to provide more than relatively small travelling-field creating means which are carried by the vehicle; moreover, by this means, a multiplicity of separate vehicles may be controlled independently on the same track. The conducting strip will be for the linear motor what would be the rotor of a rotary induction motor; the stator carried by the vehicle will comprise a plurality of windings fed with polyphase alternating current.

In such traction systems, the problem of braking the vehicle arises, and it is an object of the present invention to provide a novel and effective means of achieving braking.

A linear motor, like other electromagnetic machines, can function either as motor or generator, without reconnection of the windings or of the supply. The direction of current flow through the motor is simply determined by the relative speed of the travelling field and the conductor. If the latter is less than the speed of the travelling magnetic field, the machine is a motor, drawing electrical power from the supply and supplying force in an attempt to raise the relative speed to that of the field. If the relative speed exceeds that of the field, the power flow is reversed and the motor acts as a generator, supplying electrical power into the supply to which it is connected and producing force in such a direction as to tend to reduce the relative speed to the field speed.

In the case of generator action two features distinguish a linear induction machine from the type of synchronous generator usually employed in power stations. Firstly, the output windings on the stator must be connected to an auxiliary source of voltage or the machine cannot generate at all, for it is not capable of supplying reactive VA and therefore cannot set up its own field. Secondly, if its speed is above synchronism, power must flow out of the machine into the auxiliary source of voltage. If, therefore, the auxiliary source consists of a single alternator with no additional load, raising the speed of the induction generator will cause power to flow into the alternator which will cause it to become a motor, tending to raise the speed of the auxiliary set and therefore to increase the frequency of the induction generator output so as to bring its field speed nearer to the speed of its rotor. Thus an induction machine always produces effects which tend to bring the rotor speed and field speed into coincidence and the method by which this is achieved depends on the relative power capacities of the machine itself and the various components of the system to which it is connected.

An induction machine can be caused to generate if its stator windings are simply connected to a capacitive reactance which will supply reactive VA to the machine. In such a system it is not obvious at what frequency the machine will generate. In the case of an auxiliary alternator, the latter's prime mover determines the frequency in the event of such prime mover being more powerful than that of the induction generator, less the electrical load which it supplies. If the prime mover of the auxiliary alternator is weak, the frequency of the generated A.C. will be set by the speed of the induction machine. A capacitive reactance auxiliary system is comparable with the latter case in that the speed of the generator sets the frequency which, however, is modified by the load power delivered. The difference in the case of the capacitive auxiliary is that the induction generator must excite to such a flux density that its magnetising reactance is caused to tune with the capacitance at the frequency dictated by prime mover and load. In this respect it resembles a D.C. generator whose terminal voltage depends on the shape of the B–H characteristic of the steel used in the machine. This is merely a matter of design.

If necessary, speed variation may be obtained with a linear motor. Thus the frequency of the supply voltage can be varied, but as an alternative, tappings to the, or certain, windings of the stator are arranged to be switched to give a change of pole-pitch, the speed of the travelling field of the motor, for constant supply frequency, being directly proportional to pole-pitch, so that speed increases may be obtained by switching the windings in stages. When braking is desired, the frequency of supply is reduced or the windings are switched to reduce the pole-pitch thus increasing the number of poles and the synchronous speed of the motor is reduced; the effect is then that the vehicle is overspeeding, and the motor is now driven by the vehicle to act as a generator, generating power which can be dissipated, for instance by being fed back into the supply mains, to cause a drag force on the motor and therefore on the vehicle. Alternatively the power may be dissipated in means switched additionally into the motor circuit when braking. It would usually be necessary to change the synchronous speed of the motor by stages when braking from high speeds.

An object of the present invention is to provide improved braking facilities making use of the ability of the linear motor to function regeneratively.

In accordance with the invention, in a traction system in which motive power for a vehicle is derived from linear motor means and in which the said motor means may be arranged for regenerative braking purposes, additional means is arranged, or is adapted to be arranged, to be energised by regenerative power from said motor means, so as to provide additional braking power. The additional means may comprise another linear motor means which is preferably a separate entity from said first motor means, but possibly they may both be parts of the same linear motor assembly. Preferably the second linear motor means is arranged so that, if energised from the main supply for the tractive effort, it will provide a reverse thrust tending to move the vehicle in the reverse direction.

The invention has particular, though not sole, application to a traction system in which a vehicle travels over a prepared track so that it is supported by cushions of pressurised air, thus enabling wheels to be dispensed with, and frictional forces to be greatly reduced. It is well-known that, in such systems, very high speeds are attainable and, because of the absence of mechanical contact with the track, a braking arrangement in accordance with the invention is therefore of great use, at least for braking from the higher speeds.

In order that the invention may be more fully understood, one arrangement in accordance therewith will now be described as applied to a prepared-track system, but it is to be understood that similar considerations apply to other traction systems including those involving rail-supported, permanently wheeled, vehicles; adaptation of the arrangement described below to the latter systems will be clear to those skilled in the art.

The track system which is described is one in which the track is prepared on the ground, but the invention is equally applicable to systems in which the prepared track is arranged overhead and from which the vehicles are suspended. Further details of track forms and designs of vehicles are given in the specification and drawings in U.S. Patent No. 3,174,440.

The track comprises a pair of adjacent inclined surfaces above which the vehicle is arranged to be supported on relatively thin cushions of pressurised air in known manner, the inclinations of the surfaces serving to guide and to centre the vehicle. Between the support surfaces is arranged a continuous, anchored conductor, for example of aluminium alloy, which is adapted to co-operate with the poles of a linear motor on the vehicle.

Power for the vehicle may be picked up from supplies in or along the track, or the vehicle may carry its own power generating equipment to energise the linear motor. Frequency control for the supply is either included at the generating source of the supply or, as will be necessary if two or more vehicles are to be independently controlled, on the vehicle itself. Alternatively, if variation of speed is required, switchgear under the control of the driver, or under automatic control, may be provided on the vehicle to vary the pole-pitch for variation of the synchronous speed setting of the motor.

In accordance with the present invention, a second linear motor means is provided on the vehicle and this second motor means is set for reverse thrust on the track conductor; the second motor means may be provided with pole-setting facilities and control of this facility may be incorporated into the control gear for the main traction motor.

The control system is adapted so that, if it is desired to brake the vehicle when at speed, the pole-pitch of the main motor means is set for a lower synchronous speed, thus creating a condition of overspeed of the vehicle. At the same time the second motor means is switched into circuit and the vehicle, in effect overdriving the main motor means, causes the latter to regenerate power and to energise the windings of the second motor means to create a reverse thrust on the track conductor. This reverse thrust from the second motor means augments the drag arising from the reaction on the main motor means due to regeneration in its lower speed setting, thereby assisting braking of the vehicle.

If current can be derived from the power supply, that is, if there is no power failure, current from this supply also energises the windings of the second motor means and augments the braking thrust still further.

If pole-setting arrangements are available, then, as the vehicle approaches a speed corresponding to the lower synchronous speed to which the main motor means has been set, it will be necessary to arrange that it may be possible for the motor means to be re-set for a still lower synchronous speed, and so on, in the number of stages corresponding to the number of different pole-settings available, until the vehicle has slowed sufficiently for wheeled, or skid, support of the vehicle. After that condition is reached, the vehicle will slow down safely under the frictional forces of the skid, or normal braking processes can be effected for the final braking effort.

Even though a failure of power supply may occur, the present proposal provides an augmentation of the regenerative braking power, resulting from setting of the main motor means for overspeed, by the reverse thrust which can be induced in the second motor means when fed with power generated by the overrunning motor. It is essential, however, in the event of main power failure, that the vehicle should be carrying a reactive device, or a separately driven exciter, to ensure that the strength of the magnetic field of the main motor means remains sufficient to enable the motor to regenerate power.

If pole-setting is used to provide speed ranges, then the number of settings to give a desirable range of pole-pitch changes and, in consequence, the optimum number of different synchronous speeds, will depend upon the circumstances in each system. Most probably it will be found that the higher the top speed of the vehicle, the greater will be the number of pole-settings required.

The pole-winding and switching arrangements for any particular system will need to be designed for optimum conditions, but the design considerations will be obvious to those skilled in the art, and need not be elaborated herein.

One embodiment of the invention for typical traction systems in accordance therewith will now be described by way of example with reference to the accompanying drawings.

Figure 1:
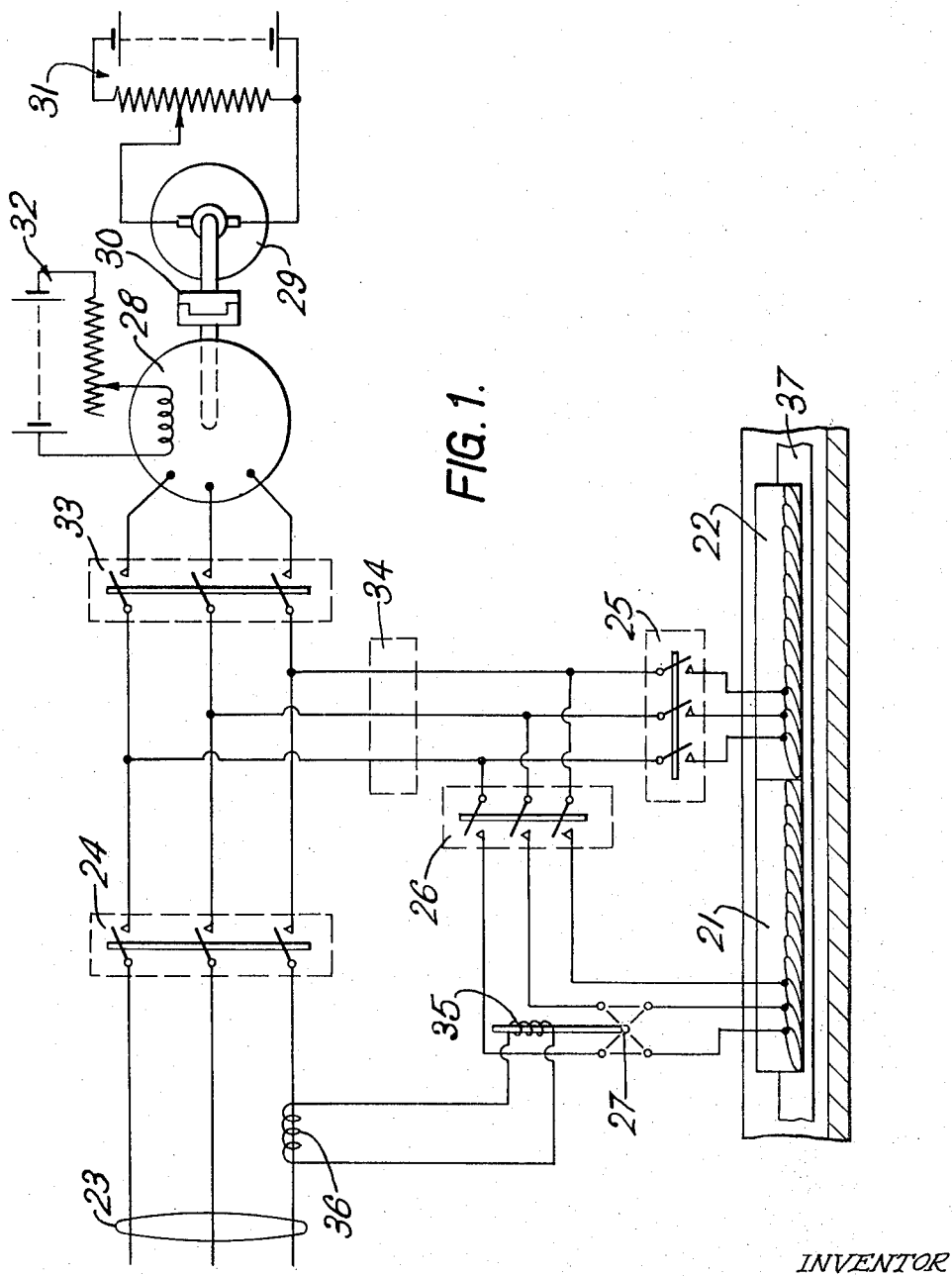
FIGURE 1 illustrates diagrammatically various main parts of the circuit on board a vehicle and connections therefor, which circuit may be used whether the vehicle is rail-borne or supported by a pressurised cushion.

Referring now to FIGURE 1, the main propulsion motor is shown as being divided into two parts 21 and 22. The stator winding of these parts are energised in parallel from a polyphase electrical supply main 23 through a main switch 24 and motor switches 26 and 25 respectively. This main supply may be picked up from conductors arranged along the track or possibly may be generated on the vehicle itself. The windings co-operate with the conductor 37 that is fixed with respect to the track and the windings are designed in known manner to cause the vehicle to move along the track at some predetermined speed. Both motors will be set to provide substantially identical pole-pitch for obvious resasons. The vehicle carries a comparatively low-inertia auxiliary alternator 28 which is coupled through a clutch 30 to a small D.C. motor 29 which is controlled by a control circuit 31. This alternator is brought up to synchronism with the main supply 23 by its motor 29 before the motor switches are closed and at near synchronous speed the switch 33 is closed to lock the alternator at the mains frequency. The control circuit 32 is provided to adjust the voltage of the alternator. In this condition, the alternator acts as a motor supplying its own friction and windage losses but it can be adapted to drive small components if required. Once the alternator has been run up to speed and locked to the main supply the motor 29 can be declutched and stopped as it takes no further part until required to restart.

The alternator functions in the same way as is described in the specification of co-pending application Ser. No. 582,066 of even date and filed as a continuation-in-part of now-abandoned application Serial No. 290,653.

A reversing switch 27 is provided to reverse the sense of thrust of the motor section 21 when required for braking the vehicle in accordance with the invention.

Thus normally the motors 21 and 22 could be switched in straightforward manner by the motor switches 25, 26 and main switch 24 to the main supply and, both motors being in forward setting, the vehicle would then travel along the track at a speed that would be appropriate to the pole-pitch presented by the windings. In accordance with the invention when it was desired to slow the vehicle down, the switch 26 could be thrown and the reversing switch 27 operated to reverse the motor part 21. Thereupon switches 26 would be reoperated to energise the motor part 21.

Thereupon the switch 24 could be thrown to isolate the motors from the mains. The fields of both motors remain excited because the alternator 28 will itself be excited by battery power. The motor 22 now acts regeneratively since it is the only possible source of power to supply the mechanical losses of the alternator together with any mechanical load the latter may be supplying and other loads, such as the motor 21, that are connected to the system. The presence of these loads will cause the alternator to slow down thereby reducing the frequency of the voltage at the terminals of the motor 22 to cause that motor to act regeneratively. As energy is drawn from the system, the braking force that is produced by the motor 22 on the track conductor causes the vehicle to slow down, tending to reduce the slip of the motor. As the same time, the continued energisation of the reversed motor 21 produces additional braking force on the track conductor so that the braking effect is considerably enhanced. As the slip of the motor tends to reduce, so the alternator will self-regulate and reduce its speed so as to maintain the loads.

With that system as described there is no separate control over the frequency fed to the loads, and therefore over setting of pole-pitch as the vehicle slows down. The frequency of the whole system reduces in sympathy and hence so does the speed of any induction or synchronous motors which are fed from the system. Control of voltage can be effected, if necessary, by regulating the exciting current of the alternator by means of the control circuit 32.

Below a certain speed which depends on the parameters of the system, the alternator cannot supply all the reactive VA needed and the electrical action collapses. However, these parameters will have been chosen so that, by that time, mechanical braking will take over.

If desired, and especially to cater for failure of supply at the source 23, the reversal of the motor 21 can be effected automatically. This is rendered possible by use of a current coil 36 on one of the supply lines which in normal running will operate an electromagnetic relay represented by coil and operating link 35 to put the motor in the forward running position. Then should the supply fail, the loss of current in the supply line causes collapse of the induced voltage in coil 36 and immediate reversal of the motor.

It is possible to arrange for the windings of the motors 21, 22 to be of a tapped type so that they may be connected in more than one combination whereby the pole-pitch of the windings may be changed. In that way more than one speed of operation of the vehicle may be provided for. Obviously speed changes can be effected without pole-change because the frequency of the supply mains may be varied; this is not usually convenient, however, if more than one vehicle is required to run on the system because then each vehicle must be controlled simultaneously.

A particular system comprising windings with tappings to give two pole-pitch settings is described and illustrated in the specification accompanying the co-pending continuation-in-part application Ser. No. 582,066 above referred to. It will be evident to one skilled in the art to adapt the windings of the motors 21 and 22 in the present case for such pole-changing, and it will be evident too that each motor must be adapted to give substantially the same changes in pole-pitch. A combined pole-setting switch may be incorporated in the circuit in the position marked 34.

The operation of a system involving pole-change will be evident from a study of the co-pending application above referred to and, for example, "Electric Traction" (Pitman 1929) by Dover, particularly at pages 293–307, and at page 85 et seq. of "Motor and Control Applications," by Hall, (McGraw-Hill, 1937); controller connections for pole-changing are also disclosed at pages 107–110 of Dawson's "Electric Traction on Railways" (The Electrician Printing and Publishing Company, 1929).

Examples of tapped winding combinations and switching details are given in "Winding Alternating-current Machines," by Liwschitz-Garik, published by Van Nostrand, 1950; see pages 570 and 587, where arrangements are shown for achieving constant power, constant torque or variable torque outputs with a three-phase, two winding motor. Typical pole combinations for four speeds are 6/8/12/16. It has to be borne in mind that if the track conductor is of ferrous material, then the linear motor has to be arranged so that the pole pieces fall on both sides of the conductor and this conductor has to be maintained central between both sets of pole pieces to avoid an unequal attractive force sideways to the track conductor. If the conductor is of an aluminium alloy or other non-ferrous alloy, the imbalance force is negligible; and for high speed operations, where conditions are almost certain to lead to some swaying movement of the vehicle due, among other reasons, to variable side wind forces, it is desirable that a non-ferrous alloy conductor should be used.

Since it may be necessary for braking to commence very shortly after a power failure it may be desirable for the braking operation to be entirely automatic, and it may be desirable in fact for the whole of the operation to be automatic, normal operation as well as braking and emergency braking. Suitable automatic gear for any particular system can be readily devised, in spite of its probable complexity, and no further information need be given here on the point. A form of pneumatically-operated controller governed by a speed responsive generator is disclosed in U.S. Patent No. 1,365,316 and in that controller a system of speed relays is adapted to be operated by the speed responsive generator in steps corresponding to certain speeds of the vehicle. In the present case such speed relays are used to cause actuation of the pneumatic valves of the controller to operate the latter for pole-switching. The sequence of settings is appropriate to the falling speed of the vehicle and ensures that, in effect, the vehicle overruns the motor. This controller is used also when controlling the normal running of the vehicle.

It may be found desirable to use the auxiliary motor 21, set for reverse thrust on the track conductor, for braking purposes during normal running, for example if extra braking power is essential. The auxiliary motor would then be energised from the main supply. Where the main power supply is carried on board the vehicle and the main motor is regenerating for braking, feeding power into the auxiliary motor, set for reverse thrust, then supply of power additionally to the auxiliary motor from the main supply yields a third braking force, adding to the drag exerted by the main motor and to the reverse thrust induced by the regenerative power.

It will be evident that in an arrangement in accordance with the invention, the great power which is dissipating into the track conductor during forward drive, as well as during braking action, is left behind the vehicle and dissipates further to the surrounding atmosphere, causing no disastrous overheating in the motor itself.

It will be appreciated that the second motor need not form part of the main motor assembly and also, or alternatively, that the two pole-setting units need not be combined, if this is desirable for space or other reasons. The possibility is not ruled out, however, of providing an auxiliary motor, which, in the interests of lightness, would be severely overrated in an emergency and might have to be replaced for a further emergency operation.

Figure 2:
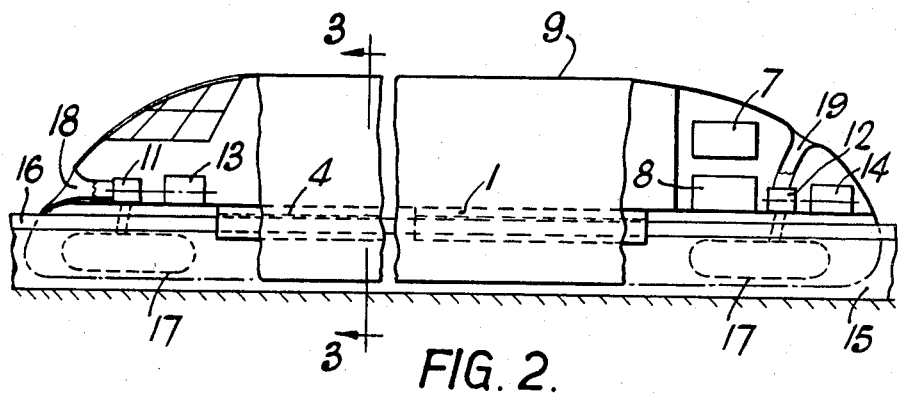
FIGURE 2 shows a part-sectional side-view of part of a system in which a vehicle is supported by a pressurised cushion on a prepared track.
Figure 3:
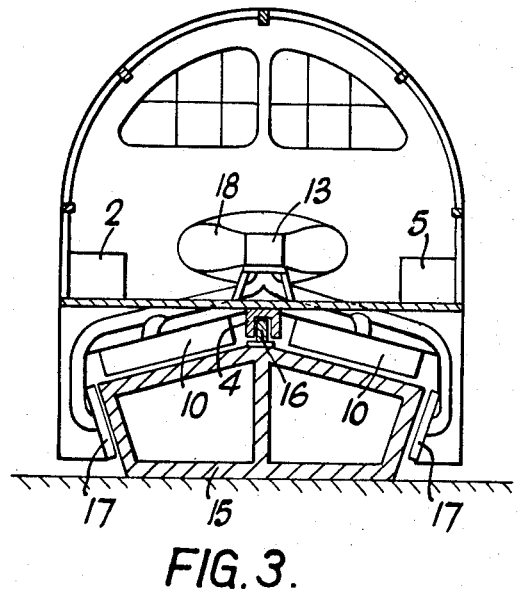
FIGURE 3 is a section on the line 3—3 in FIGURE 2, the section depicting one form of prepared track to guide the vehicle.

In the construction of vehicle typified in FIGURES 2 and 3, a suggested lay-out of the various main parts is given. The vehicle 9 comprises a central passenger or load-carrying portion and a front cabin for the driver, and since the illustration is an embodiment of a system in which vehicles are supported, at least at speed, by cushions of air, it will assist if the following features are noted.

Cushion devices, in the form of pads 10 of requisite area, are arranged to be fed with pressurised air from compressors 11, 12 driven by engines 13, 14 which may be, for instance, prime movers or electric motors fed from the main generator 8. The pressure of air from pads 10 reacts on the top portions of the inverted —V track 15 which carries the track conductor 16 and the sidewalls of which track are formed to provide reaction to pressurised air from stabilising pads 17; these stabilising air cushions may be supplied with pressurised air from the compressors 11, 12 or from separate compressors suitably driven. Suitable air intakes for the compressors 11, 12 are indicated at ducts 18, 19.

The two-part driving (braking) motor is shown at 1, 4. If required, the pole-changing unit is situated at 2, 5 and the alternator for providing reactive VA for the motor windings is shown at 7.

Other vehicle lay-outs and track systems will be evident to those skilled in the art and it is not intended that the scope of the invention shall be limited to the particular embodiments described and referred to.

I claim:

1. A traction system comprising a track, a vehicle on said track, linear motor driving means on said vehicle, conductor means rigid with said track, said linear motor driving means being adapted to react with said track conductor means to drive the vehicle along the track, means for enabling said driving motor means to function regeneratively for braking of the vehicle, additional linear motor means adapted to co-operate with said track conductor means for braking the vehicle, and switching means for applying output from said driving motor means to energise the additional motor means when the driving motor means is regenerating.

2. A traction system comprising a vehicle arranged for travel along a track, linear motor means on said vehicle, a substantially continuous conductor means fixed relatively to said track, said motor means being adapted to provide a travelling field which causes reaction between the vehicle and the track conductor for driving the vehicle along the track, means for ensuring that said driving motor means acts regeneratively when the speed of the vehicle is greater than that of the travelling field, and additional electrical means on the vehicle for braking purposes, said additional braking means being arranged for energisation by said driving motor means when acting regeneratively.

3. A traction system comprising a vehicle arranged for travel along a track, linear motor means on said vehicle, a substantially continuous conductor means fixed relatively to said track, said motor means being adapted to provide a travelling field which causes reaction between the vehicle and the track conductor for driving the vehicle along the track, means for ensuring that said driving motor means acts regeneratively when the speed of the vehicle is greater than that of the travelling field, and additional linear motor means arranged to provide a travelling field which causes reaction in the opposite sense to that of the driving motor means for braking purposes, said additional motor means being arranged for energisation by said driving motor means when acting regeneratively.

4. A traction system as claimed in claim 3, wherein the driving linear motor means and the additional braking linear motor means form parts of a single linear motor means.

5. A control arrangement for a vehicle in a traction system in which substantially continuous conductor means are fixed relatively to a track on which the vehicle runs, said control arrangement including linear motor driving means on the vehicle, windings of said motor means being adapted to provide a travelling electromagnetic field which causes reaction between the vehicle and the conductor means to drive the vehicle along the track, switching means having connections to said windings to vary the pole-pitch of said travelling field, said switching means being adapted to connect the windings of the motor means for regenerative braking of the vehicle, separate electromagnetic braking means for said vehicle, and separate switching means for said separate braking means, said separate switching means being adapted to connect said separate braking means for energisation by regenerative power from said driving motor means when the latter is set for regenerative braking.

6. A control arrangement for a vehicle in a traction system in which substantially continuous armature means are fixed relative to a track on which the vehicle runs, said control arrangement including linear motor driving means on the vehicle, windings of said motor means being adapted to provide a travelling electromagnetic field which causes reaction between the vehicle and the armature means to drive the vehicle along the track, switching means having connections to said windings to vary the pole-pitch of said travelling field, said switching means being adapted to connect the windings of the driving motor means for regenerative braking of the vehicle, second linear motor means on the vehicle, means for setting said second motor means to provide a travelling electromagnetic field which moves in the reverse direction to said first field, and separate switching means, said separate switching mean being adapted to connect said second linear motor means for energisation by regenerative power from said driving motor means when the latter is set for regenerative braking, thereby providing additional braking for the vehicle.

7. A control arrangement as claimed in claim 6, wherein said driving motor means and said second motor means form parts of a composite motor means.

8. A control arrangement for a vehicle in a traction system in which substantially continuous armature means are fixed relatively to a track on which the vehicle runs, said control arrangement including linear motor driving means on the vehicle, a source of power for said motor means, windings of said motor means being adapted to provide a travelling electromagnetic field which causes reaction between the vehicle and the armature means to drive the vehicle along the track, switching means having connections to said windings to vary the pole-pitch of said travelling field, said switching means being adapted to connect the windings of the motor means for regenerative braking of the vehicle, separate electromagnetic braking means for said vehicle, means for providing a signal proportional to the speed of the vehicle, excitation means, said excitation means being carried by the vehicle and being arranged to provide suitable excitation of the magnetic field of at least part of said driving motor means, said switching means being adapted to connect said windings for the different pole-pitches in dependence upon said speed signal and being adapted, on failure or disconnection of said power supply when the vehicle is in motion, to change said pole-pitch settings for successively lower speed settings as the speed of the vehicle decreases, so that the driving motor means is set to be, in effect, overrun, by the vehicle, with the result that, upon failure or disconnection of said main power supply, the driving motor means acts regeneratively through excitation of its magnetic field by said excitation means to brake the vehicle, and separate switching means for said separate braking means, said separate switching means being adapted to connect said separate braking means for energisation by regenerative power from said driving motor means when the latter is set for regeneration.

9. A control arrangement as claimed in claim 8, wherein said separate braking means comprises linear motor means.

References Cited

UNITED STATES PATENTS

| | | | |
|---|---|---|---|
| 1,231,605 | 7/1917 | Hellmund | 318—87 |
| 1,231,665 | 7/1917 | Storer | 318—87 X |
| 1,236,711 | 8/1917 | Hickling | 318—87 X |
| 1,236,760 | 8/1917 | Renshaw | 318—87 X |
| 1,245,523 | 11/1917 | Storer | 318—87 X |
| 1,358,580 | 11/1920 | Rouviere | 318—87 X |
| 1,365,316 | 1/1921 | Hall | 318—87 X |
| 1,378,511 | 5/1921 | Axtell | 318—87 |
| 1,603,102 | 10/1926 | Alexanderson | 318—87 X |
| 3,055,312 | 9/1962 | Jay et al. | |
| 3,090,327 | 5/1963 | Crowley. | |
| 3,096,728 | 7/1963 | Amman et al. | |
| 3,125,964 | 3/1964 | Silverman | 104—148 X |
| 3,158,765 | 11/1964 | Polgreen | 310—12 |
| 3,233,559 | 2/1966 | Smith et al. | 105—1 |

FOREIGN PATENTS

| 867,045 | 5/1961 | Great Britain. |
|---|---|---|

ARTHUR L. LA POINT, *Primary Examiner.*

STANLEY T. KRAWCZEWICZ, *Assistant Examiner.*